(12) United States Patent
Okada

(10) Patent No.: US 7,260,697 B2
(45) Date of Patent: Aug. 21, 2007

(54) DATA STORAGE DEVICE AND METHOD OF ERASING DATA STORED IN THE DATA STORAGE DEVICE

(75) Inventor: Keisuke Okada, Gunma (JP)

(73) Assignee: NEC Corporation, Tokyo (JP)

( * ) Notice: Subject to any disclaimer, the term of this patent is extended or adjusted under 35 U.S.C. 154(b) by 207 days.

(21) Appl. No.: 10/284,257

(22) Filed: Oct. 31, 2002

(65) Prior Publication Data

US 2003/0088745 A1 May 8, 2003

(30) Foreign Application Priority Data

Nov. 2, 2001 (JP) ............................. 2001-337542

(51) Int. Cl.
*G06F 9/312* (2006.01)
*G06F 1/24* (2006.01)

(52) U.S. Cl. .................... 711/166; 365/185.29; 365/218

(58) Field of Classification Search ................ 361/143, 361/159, 267; 360/57; 711/103, 104, 111, 711/156, 159, 166; 713/1, 100; 714/701
See application file for complete search history.

(56) References Cited

U.S. PATENT DOCUMENTS

| 5,542,082 A | | 7/1996 | Solhjell ....................... 711/115 |
| 6,279,128 B1 | * | 8/2001 | Arnold et al. ................. 714/49 |
| 6,507,885 B2 | * | 1/2003 | Lakhani et al. ................ 711/5 |
| 6,839,774 B1 | * | 1/2005 | Ahn et al. ..................... 710/14 |
| 2003/0018869 A1 | * | 1/2003 | Hou ........................... 711/170 |

FOREIGN PATENT DOCUMENTS

| JP | 64-053241 | 3/1989 |
| JP | 02-210603 | 8/1990 |
| JP | 04-217044 | 8/1992 |
| JP | 6-187199 | 7/1994 |
| JP | 07-161092 | 6/1995 |
| JP | 3045410 | 11/1997 |
| JP | 2001-22647 | 1/2001 |

OTHER PUBLICATIONS

"Managing Your Hard Disk," Berliner, 1986. pp. 263-266.*
"Peter Norton's Inside the PC," 5th Ed., Norton.1993. pp. 161-162.*
Chinese Office Action dated Feb. 27, 2004 with English Translation.
Japanese Office Action dated Oct. 26, 2004 with Partial English Translation.
Japanese Office Action dated Nov. 8, 2005 with partial English Translation.

* cited by examiner

*Primary Examiner*—B. James Peikari
(74) *Attorney, Agent, or Firm*—McGinn IP Law Group, PLLC

(57) ABSTRACT

A recording medium stores data supplied from an external device. A memory stores an erase program for executing erasing of the data stored in the recording medium. An erasing unit erases the data stored in the recording medium in accordance with the erase program stored in the memory, in accordance with a start instruction for instructing a start of erasing the data supplied from the external device.

12 Claims, 3 Drawing Sheets

DATA STORAGE DEVICE AND METHOD OF ERASING DATA STORED IN THE DATA STORAGE DEVICE

BACKGROUND OF THE INVENTION

1. Field of the Invention

The present invention relates to a data storage device. Further, the present invention relates to a method of erasing data stored in a data storage device.

2. Description of the Related Art

When selling or disposing of a computer, the owner of the computer usually formats the hard disk of the computer in order to prevent data stored in the hard disk from being seen by others.

However, a hard disk format program such as one included in Windows™ does not completely erase data stored in a hard disk.

To be more specific, the hard disk format program only initializes the management area in which dates of creating data, data sizes, addresses indicating the storage locations of data, etc. are stored. In other words, the hard disk format program does not initialize the data area in which data are stored.

Therefore, even after the hard disk is formatted by the hard disk format program, data are kept in the data area.

The data kept in the hard disk after being formatted can be read out by, for example, software for restoring data which has been erased by mistake.

Accordingly, in order to securely prevent data stored in the hard disk from being seen by others, data in the data area needs to be erased.

Hence, there have been attempts to completely erase data stored in the hard disk by writing predetermined data both the administration area and the data area.

In this case, the main body of the computer (specifically, the CPU (Central Processing Unit)) designates data to be written upon and locations of data writing. The hard disk writes the data designated by the host computer on the designated locations.

When writing of the data on the designated locations is completed, the host computer designates data to be written upon next and next locations of data writing. The hard disk writes the data designated by the host computer on the designated locations.

By repeating this operation, the data stored in the hard disk are completely erased.

However, according to this method, communications are repeated many times between the host computer and the hard disk from the start of data erasing until the end. Therefore, if the hard disk has large capacity, there arises a problem that it takes a long time to erase all the data stored.

SUMMARY OF THE INVENTION

Accordingly, an object of the present invention is to provide a data storage device which erases its stored data in a short time. Another object of the present invention is to provide a data erasing method of erasing data stored in a data storage device in a short time.

To achieve the above objects, a data storage device according to a first aspect of the present invention comprises:

a recording medium which stores data;

a memory which stores an erase program for executing erasing of the data stored in the recording medium; and an erasing unit which erases the data stored in the recording medium in accordance with the erase program stored in the memory, in response to a start instruction for instructing a start of erasing the data which is supplied from an external device.

According to this invention, it is possible to erase the data stored in the data storage device in a short period of time.

The erasing unit may comprise:

an output unit which outputs a first data stream for confirming the start instruction to the external device;

a first controller which determines whether or not a second data stream which is output from the external device in response to the first data stream output from the output unit coincides with the first data stream; and an eraser which erases the data stored in the recording medium, in a case where the first controller determines that the second data stream coincides with the first data stream.

The erasing unit may comprise a generator which generates the first data stream randomly.

The erasing unit may comprise a second controller which determines whether or not the second data stream has been supplied from the external device within a predetermined period of time after the output unit outputted the first data stream.

The first controller may determine whether or not the second data stream coincides with the first data stream, in a case where the second controller determines that the second data stream has been supplied within the predetermined period of time.

The recording medium may comprise a data area which stores the data, and an administration area which stores administration information for administrating the data.

The eraser may write predetermined data upon both of the data area and the administration area, thereby to erase the data stored therein.

The eraser may comprise:

a determination unit which determines written data to be written upon the data stored in the recording medium, and a location upon which the written data is to be written, in accordance with the erase program; and a written which writes the written data determined by the determination unit upon the location determined by the determination unit, thereby erases the data stored in the recording medium.

A data erasing method according to a second aspect of the present invention is a data erasing method of erasing data stored in a data storage device, wherein:

the data storage device stores an erase program for executing erasing of data stored in the data storage device;

the data erasing method comprises erasing the data stored in the data storage device in accordance with the erase program, in response to a start instruction for instructing a start of erasing the data which is supplied from an external device.

The erasing may comprise:

outputting a first data stream for confirming the start instruction from the data storage device to the external device;

firstly determining in the data storage device whether or not a second data stream which is output from the external device in response to the first data stream coincides with the first data stream; and executing erasing of the data stored in the data storage device, in a case where it is determined in the firstly determining that the second data stream coincides with the first data stream.

The erasing may comprise generating in the data storage device, the first data stream randomly.

The erasing may comprise secondly determining whether or not the second data stream has been supplied from the external device within a predetermined period of time after the first data stream was output from the data storage device.

The firstly determining may comprise determining in the data storage device whether or not the second data stream coincides with the first data stream, in a case where it is determined in the secondly determining that the second data stream has been supplied within the predetermined period of time.

The data storage device may comprise a data area which stores the data, and an administration area which stores administration information for administrating the data.

The executing may comprise writing by the data storage device, predetermined data upon both of the data area and the administration area, thereby erasing the data stored therein.

The executing may comprise:
thirdly determining in the data storage device, written data to be written upon the data stored in the data storage device and a location upon which the written data is to be written, in accordance with the erase program; and
writing by the data storage device, the written data determined in the thirdly determining upon the location determined in the thirdly determining, thereby erasing the data stored in the data storage device.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A data storage device according to an embodiment of the present invention will now be explained with reference to the attached drawings.

The data storage device according to the present embodiment will be installed inside or outside a personal computer or workstation. The data storage device stores data supplied from a computer, or erases all data stored therein completely in response to a instruction from the computer.

The data storage device will now be explained by employing a hard disk as an example.

Figure 1:
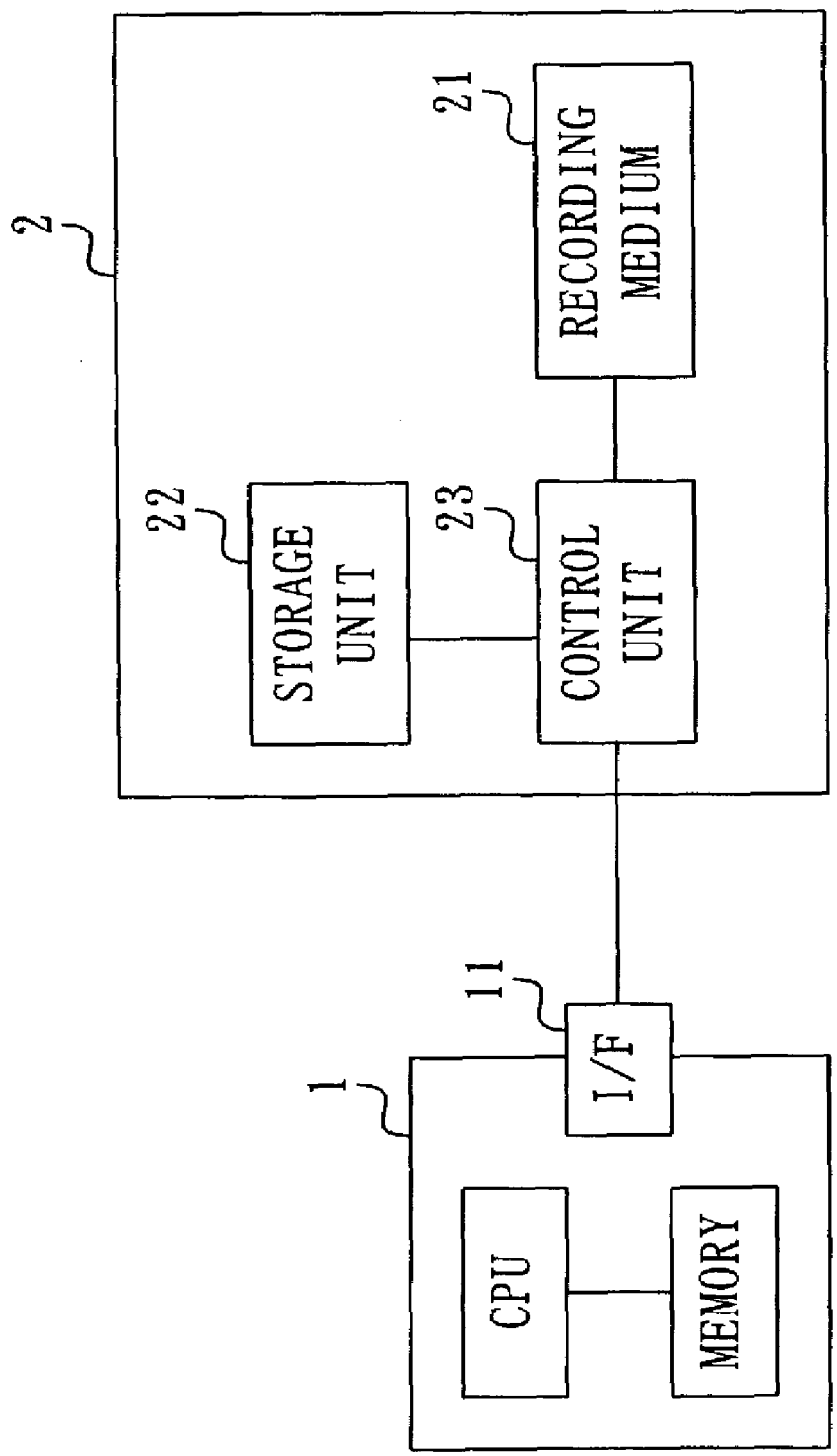
FIG. 1 is a diagram showing a structure of a hard disk and a structure of a host computer to which the hard disk is connected according to the embodiment of the present invention.

The computer comprises a host computer 1 including a CPU (Central Processing Unit) and a memory shown in FIG. 1, and an input device and an output device not shown in FIG. 1. The input device comprises a keyboard and a mouse, etc., and the output device comprises a display formed of a CRT (Cathode Ray Tube) or a liquid crystal panel.

The host computer 1 has a hard disk interface (I/F) 11 to which a hard disk 2 will be connected, and thus can perform data communication with the hard disk 2.

The host computer 1 (specifically, the CPU) performs various processes in accordance with programs stored in the memory, and stores data representing a result of a performed process in the hard disk 2. The host computer 1 (specifically, the CPU) instructs the hard disk 2 to start erasing all data stored in the hard disk 2, in accordance with an operation of a user.

The hard disk 2 comprises a recording medium 21, a storage unit 22, and a control unit 23.

Figure 2:
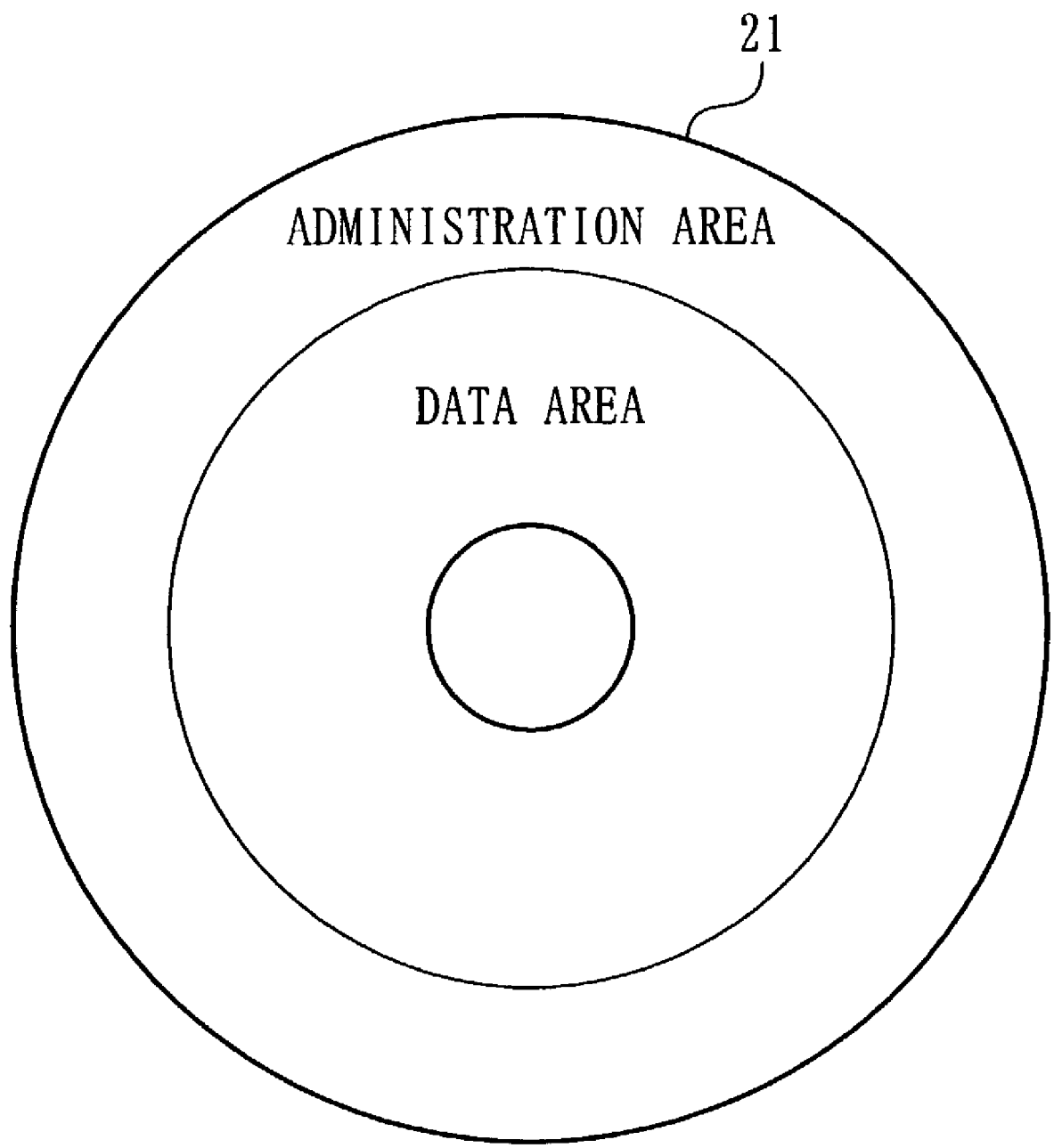
FIG. 2 is a diagram showing a structure of a recording medium constituting the hard disk shown in FIG. 1.

The recording medium 21 is constituted by one or more disk(s) covered with magnetic body. The recording medium 21 has a data area for storing data supplied from the host computer 1, and an administration area for storing administration information such as a date of creating data, data size, an address indicating storage location of data, etc., as shown in FIG. 2.

The storage unit 22 is constituted by a RAM (Random Access Memory) and a ROM (Read Only Memory), and stores a program for controlling the operation of the control unit 23.

The control unit 23 is constituted by a CPU (Central Processing Unit), and is connected to the hard disk interface 11. The control unit 23 controls a motor and a magnetic head (not shown) in accordance with an instruction of the host computer 1, in order to record data supplied from the host computer 1 in the recording medium 21. The control unit 23 controls the motor and magnetic head (not shown) in accordance with an instruction of the host computer 1, in order to completely erase all data stored in the recording medium 21.

Next, the operations of the host computer 1 and the hard disk 2 when erasing all data stored in the recording medium 21 will be explained.

First, a user operates the input device (not shown) to instruct the host computer 1 to erase all data stored in the recording medium 21.

Figure 3A:
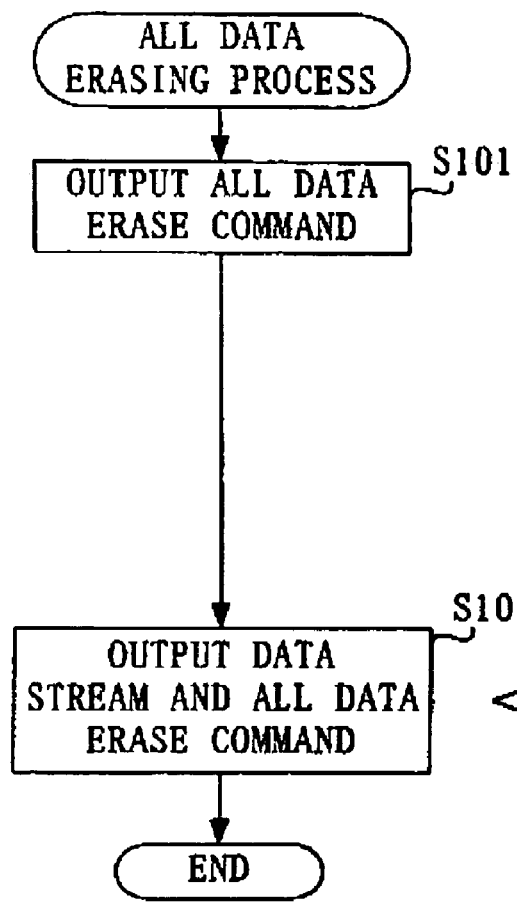
FIG. 3A is a flowchart showing an all data erasing process performed by the host computer shown in FIG. 1.

In response to the instruction of the user, the host computer 1 (specifically, the CPU) starts an all data erasing process shown in FIG. 3A in accordance with a program stored in the memory.

First, the host computer 1 outputs an erase all data command for instructing the start of erasing all data to the hard disk 2 (step S101).

Figure 3B:
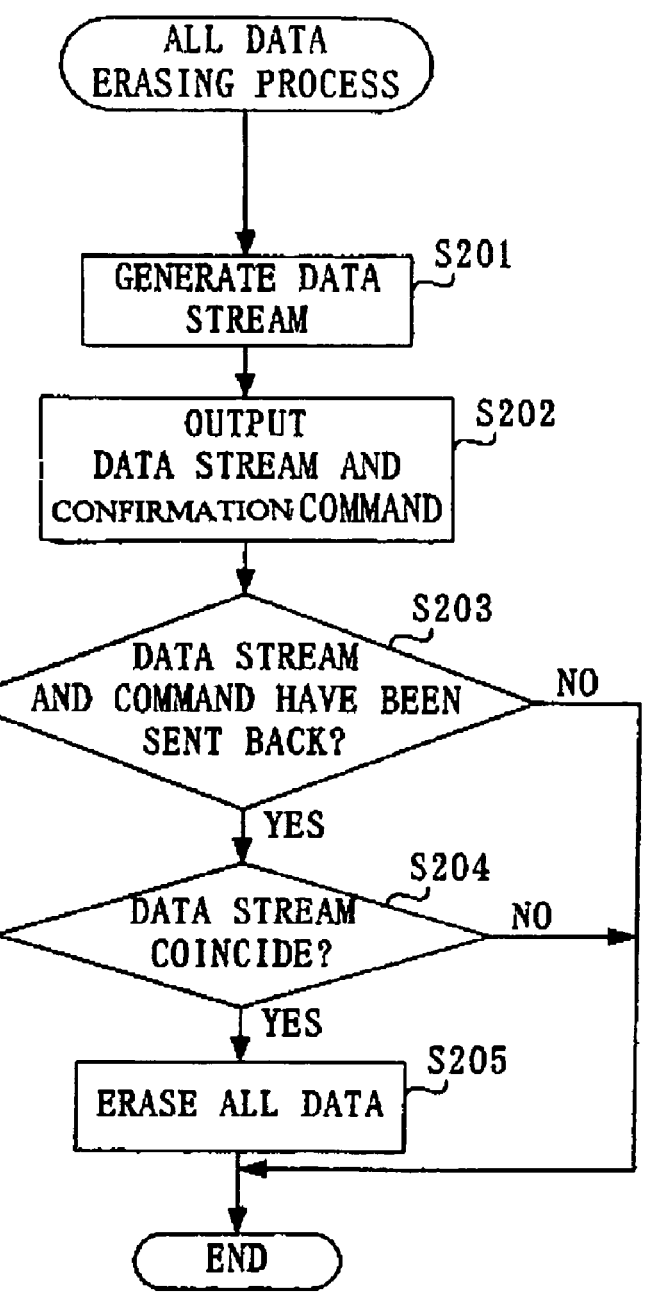
FIG. 3B is a flowchart showing an all data erasing process performed by the hard disk shown in FIG. 1.

In response to the erase all data command supplied from the host computer 1, the control unit 23 of the hard disk 2 starts an all data erasing process shown in FIG. 3B in accordance with a program stored in the storage unit 22.

First, the control unit 23 generates a random data stream for confirming the instruction to erase all data (step S201 in FIG. 3B).

Then, the control unit 23 outputs the generated random data stream (e.g., generated in S201) and a confirmation command for confirming the instruction to erase all data (from S101) to the host computer 1 (step S202).

If the host computer 1 is operating properly, then the host computer 1 outputs a data stream which is identical to the supplied data stream (i.e., the generated random data stream) and the above described erase all data command to the hard disk 2, in response to the generated random data stream and the confirmation command which are received by the host computer from the control unit 23 (step S102).

If the host computer 1 is not operating properly, then the host computer 1 does not output a data stream which is identical to the supplied data stream (i.e., the generated random data stream) and the erase all data command in response to the generated random data stream and the confirmation command which were received by the host computer 1 from the control unit 23. Or, the host computer 1 may output a data stream which is different from the supplied data stream (i.e., the generated random data stream) to the hard disk 2 in response to the generated random data stream and the confirmation command which were received by the host computer 1 from the control unit 23. Or, the host computer 1 may output an irrelevant command to the hard disk 2 in response to the generated random data stream and the confirmation command which were received by the host computer 1 from the control unit 23.

The control unit 23 determines whether or not a data stream and the erase all data command have been sent back to the control unit 23 from the host computer 1 within a predetermined period of time after the control unit 23 outputted the generated random data stream and the confirmation command (step S203).

If the control unit 23 determines that a data stream and the erase all data command have not been sent back (step S203; NO), then the control unit 23 determines that the host computer 1 is not operating properly, and thus stops the all data erasing process.

On the contrary, if the control unit 23 determines that a data stream and the erase all data command have been sent back (step S203; YES), then the control unit 23 determines whether or not the data stream which is received from the host computer 1 in S102 and the generated random data stream which the control unit 23 outputted in step S202 coincide with (i.e., are identical to) each other (step S204).

If the control unit 23 determines that the data stream which is received from the host computer 1 in S102 and the generated random data stream which the control unit 23 outputted in S202 do not coincide with (i.e., are not identical to) each other (step S204; NO), then the control unit 23 determines that the host computer 1 is not operating properly, and stops the all data erasing process.

On the contrary, if the control unit 23 determines that the data stream which is received from the host computer 1 in S102 and the generated random data stream which the control unit 23 outputted in S202 coincide with each other (i.e., are identical to each other) (step S204; YES), then the control unit 23 erases all the data stored in the data area and the administration area of the recording medium 21 (step S205) (e.g., see FIG. 2).

Specifically, the control unit 23 writes predetermined data upon the data area and the administration area of the recording medium 21 in accordance with the program stored in the storage unit 22. At this time, the control unit 23 determines the predetermined data and a location on which the predetermined data is written in accordance with the program stored in the storage unit 22. Due to this, the control unit 23 completely erases all of the data stored in the data area and the administration area of the recording medium 21.

As described above, the control unit 23 erases all the data stored in the data area and the administration area of the recording medium 21 in accordance with the program stored in the storage unit 22. Therefore, all that the host computer 1 has to do is to instruct the start of all data erasing (S101), and the host computer 1 does not need to communicate with the hard disk 2 until the end of all data erasing (S205), once this process is started. As a result, all the stored data can be erased in a shorter time than ever before.

Further, the control unit 23 confirms the instruction to erase all data, by outputting the generated random data stream and the confirmation command to the host computer 1 (S202). Because of this confirmation step, if an erase all data command is output by the host computer 1 which is not operating properly, the data stored in the recording medium 21 is prevented from being erroneously erased when the host computer 1 is not operating properly (e.g., see S202, S102, S203, S204, and S205 of FIGS. 3A and 3B).

In addition, the present invention can be applied to other ways than erasing all data stored in the hard disk 2. For example, the present invention can be applied to erasing all data stored in a recording medium which can record data magnetically or optically (such as a flexible disk, CD-ROM, etc.).

Various embodiments and changes may be made there unto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-337542 filed on Nov. 2, 2001 and including specification, claims, drawings and summary. The disclosure of the above Japanese Patent Application is incorporated herein by reference in its entirety.

What is claimed is:

1. A data storage device comprising:
   a recording medium which stores data;
   a memory which stores an erase program for executing erasing of the data stored in said recording medium; and
   an erasing unit which erases the data stored in said recording medium in accordance with the erase program stored in said memory, in response to a start instruction for initiating the erasing of the data, said data being supplied from an external device,
   wherein said erasing unit comprises:
      a first controller which determines whether or not a second data stream which is output from said external device in response to a first data stream is identical to the first data stream; and
      an eraser which erases the data stored in said recording medium, in a case where said first controller determines that the second data stream is identical to the first data stream.

2. The data storage device according to claim 1, wherein said erasing unit further comprises:
   an output unit which outputs the first data stream for confirming the start instruction to said external device.

3. The data storage device according to claim 2, wherein said erasing unit comprises a generator which generates the first data stream randomly.

4. The data storage device according to claim 3, wherein:
   said erasing unit comprises a second controller which determines whether or not the second data stream has been supplied from said external device within a predetermined period of time after said output unit outputted the first data stream; and
   said first controller determines whether or not the second data stream is identical to the first data stream, in a case where said second controller determines that the second data stream has been supplied within the predetermined period of time.

5. The data storage device according to claim 4, wherein:

said recording medium comprises a data area which stores the data, and an administration area which stores administration information for administrating the data; and said eraser writes predetermined data upon both of the data area and the administration area, thereby erasing the data stored therein.

6. The data storage device according to claim 4, wherein said eraser comprises:

a determination unit which determines written data to be written upon the data stored in said recording medium, and a location upon which the written data is to be written, in accordance with the erase program; and a writer which writes the written data determined by said determination unit upon the location determined by said determination unit, thereby erases the data stored in said recording medium.

7. The data storage device according to claim 2, wherein said memory comprises:

a storage unit which stores said erase program for executing erasing of the data stored in said recording medium; wherein said erasing unit comprises:

a control unit which erases the data stored in said recording medium in accordance with the erase program stored in said memory, in response to said start instruction for initiating the erasing of the data which is supplied from said external device; and wherein said external device comprises:

a host computer.

8. The data storage device according to claim 7, wherein said control unit comprises:

a receiving unit which receives the start instruction which is supplied from the host computer;

a generating unit which generates a random data stream;

an output unit which outputs said generated random data stream to said host computer for confirming the start instruction which is supplied from the host computer, wherein said receiving unit receives a second data stream which is output from said host computer in response to the generated random data stream;

a first determining unit which determines whether said second data stream is output from said host computer in response to the generated random data stream; and a second determining unit which, if said first determining unit determines that the second data stream is output from the host computer in response to the generated random data stream, determines whether said second data stream is identical to the generated random data stream; and an eraser unit which erases the data stored in said recording medium, only if the second determining unit determines that the second data stream, which is output from the host computer, is identical to the generated random data stream.

9. The data storage device according to claim 1, wherein said external device includes a host computer.

10. The data storage device according to claim 9, wherein said host computer includes a central processing unit, a memory, and a data storage device interface.

11. The data storage device according to claim 10, wherein said data storage device communicates with said host computer through said data storage device interface.

12. A data storage device comprising:

a recording medium which stores data;

a memory which stores an erase program for executing erasing of the data stored in said recording medium; and an erasing unit which erases the data stored in said recording medium in accordance with the erase program stored in said memory, in response to a start instruction for initiating the erasing of the data which is supplied from an external device, wherein said erasing unit comprises:

means for receiving the start instruction which is supplied from the external device;

means for generating a random data stream;

means for outputting said generated random data stream to said external device for confirming the start instruction which is supplied from the external device, wherein said means for receiving receives a second data stream which is output from said external device in response to the generated random data stream;

first determining means for determining whether said second data stream is output from said external device in response to the generated random data stream; and second determining means for determining whether said second data stream is identical to the generated random data stream; and erasing means for erasing the data stored in said recording medium only if said second determining means determines that the second data stream is identical to the generated random data stream.

* * * * *